Patented Mar. 6, 1923.

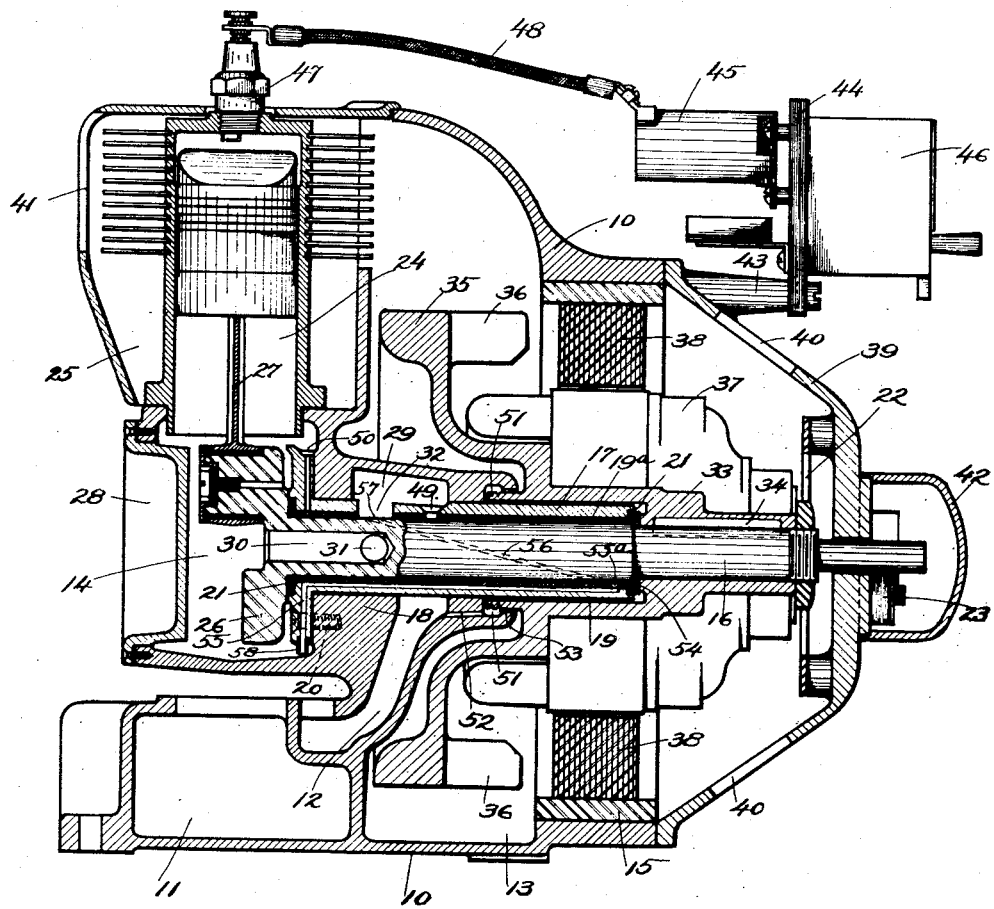

1,447,371

UNITED STATES PATENT OFFICE.

EDWARD F. ANDREWS AND RAY E. ACRE, OF MAYWOOD, ILLINOIS.

SINGLE-UNIT GENERATING PLANT.

Application filed July 5, 1918. Serial No. 243,449.

*To all whom it may concern:*

Be it known that we, EDWARD F. ANDREWS, a citizen of the United States, residing at Maywood, in the county of Cook and State of Illinois, and RAY E. ACRE, a citizen of the United States, residing at Maywood, in the county of Cook and State of Illinois, have invented certain new and useful Improvements in Single-Unit Generating Plants, of which the following is a specification.

This invention relates to improvements in single unit electric generating plants and more particularly to improvements in the generating plant which forms the subject matter of our co-pending application, filed February 21, 1917, Serial No. 148,015, the present application being a continuation in part of said prior application.

One object of the present invention is to simplify the construction of the generating plant illustrated and described in the above-identified application by providing a single plain bearing for the common shaft thereof, whereby the possibility of improperly aligned bearings and the trouble and expense incident to the use of more than one bearing are obviated; a further object being to mount said bearing in a removable sleeve whereby the same may be readily and quickly withdrawn at any time to permit of repairing or renewing the same.

Another object of the invention is to provide means whereby a portion of the oil fed to the hydro-carbon engine with the fuel charge may be conducted to said bearing, thereby lubricating the same; together with means whereby said oil after the same has been discharged from said bearing will be drawn by the suction of the engine into the intake manifold thereof, where it is again mixed with the fuel charge as the same passes therethrough, thus eliminating the possibility of oil leakage.

A further object resides in the provision of a novel and simplified form of intake valve for the hydro-carbon engine.

An additional object of the invention is to provide a housing for a single unit generating plant of the type described, which shall be provided with a main casting comprising an intake manifold and crank case for the hydro-carbon engine, a fly-wheel and blower-housing, and a field frame for the generator.

Another object of the invention resides in the provision of a single unit generating plant wherein the fly-wheel of the hydro-carbon engine and the armature of the generator shall be mounted on a common hub, whereby a simplified construction is provided which is efficient in operation, and which lends itself readily to economical manufacture.

Other objects and advantages will be apparent from the following description taken in connection with the accompanying drawings wherein the preferred embodiment of the invention is illustrated, said illustration being in the form of a vertical longitudinal sectional view taken through a single unit plant constructed in accordance with the present invention.

Referring more in detail to the drawings, the main casting of the generating plant is illustrated at 10 and is shown comprising a fuel tank 11, intake manifold 12, fly-wheel and blower-housing 13, crank case 14 of the hydro-carbon engine, and the field frame 15 of the generator. A suitable shaft 16 is shown extending longitudinally through the main casting, said shaft being adapted to receive all of the rotary elements of the entire generating plant. The shaft is journaled in a suitable plain bearing 17, the central portion 18 of the main casting being provided with a suitable bore adapted to receive said bearing, substantially as shown, said bearing comprising a removable sleeve 19 which is fitted within said bore and bolted or otherwise rigidly secured to the central portion 18 of the main casting by suitable fastening means, such as illustrated at 20. The removable sleeve 19 is preferably in the form of a casting having its inner surface babbitted as at $19^a$, the outer ends of said babbitting being flanged as illustrated at 21 in order to provide bearing surfaces for the end thrusts encountered by said shaft. It will be noted from the drawings that this bearing is the only bearing provided for the shaft 16, there being no bearing provided for the forward end of said shaft where the brush rigging 22 and the timing mechanism 23 are located. Trouble from improperly aligned bearings is thus eliminated and the necessity of boring a plurality of bearing holes separately is also obviated. With one bearing, as shown in the drawings, the machining operation all may be done at one time and the bearing and shaft are then mounted therein in such manner that the rotary elements supported by said shaft will assume their proper positions. Much difficulty is often encountered in mounting a shaft true when more than one bearing is used, owing to the possibility of a misalignment of said bearings. With the structure above described, however, misalignment is altogether precluded. A further advantage of this construction resides in the elimination of the bearing heretofore provided at the forward end of the shaft, as shown in our co-pending application above identified, in view of the fact that the commutator and brushes are more easily accessible for inspection and cleaning. Furthermore, the possibility of the commutator and brush rigging becoming gummed or otherwise impaired, as a result of oil leaking from the bearing and lodging thereon, and subsequently accumulating dirt and other foreign substances, is obviated.

The hydro-carbon engine of the generating plant is illustrated at 24, said engine being preferably of the two-cycle internal combustion type. A suitable housing for the hydro-carbon engine cylinder is illustrated at 25. Formed integrally with the inner end of the shaft 16 is the crank bob 26 of the engine 24, the connecting rod 27 of said engine being connected thereto in any desirable manner. The outer side wall of the crank case 14 is preferably in the form of a detachable cover plate 28. As above set forth, the intake manifold 12 of the engine preferably forms an integral part of the main casting 10, said manifold terminating in a substantially annular chamber 29, which surrounds the shaft bore provided in the central portion 18 of the main casting 10. The shaft 16 is provided at its inner end with an axial bore 30 which opens at one end into the crank case of the engine and which communicates at its other end by means of the radial bore 31 with the chamber 29 of the intake manifold, said communication between said chamber and said crank case being governed by the slot 32 provided in the shaft bearing, as shown in the illustration, said slot being of such circumferential extent as to open the passage between said chamber and crank case at the proper point in the cycle of operation of the engine to allow the fuel charge to be drawn therethrough into said crank case, and to close said passage at the end of the intake stroke. This rotary intake valve for the hydro-carbon engine is preferably so timed that the passage from the intake manifold into the crank case is open during a period of approximately 180° and closed during a like period, the engine 24, as above pointed out, being of the usual two-cycle type. This rotary intake valve, above described, has many advantages over the ordinary disc valve commonly used in two-cycle engines. It is well known that in disc valves the rubbing speed increases continually from the center toward the periphery, which produces unequal wear and makes it difficult to effectively seal the crank case during the compression stroke of the engine. It will be noted that the rubbing speed of the rotary valve herein described is uniform at all times, and, as the bearing surfaces on each side of the opening are of substantial length, a tight joint is assured throughout the life of the bearing.

Mounted on the shaft 16, preferably between the brush rigging 22 and the outer end of the removable sleeve 19, is a hub 33, said hub being keyed to said shaft as at 34. Formed integral with, or bolted, or otherwise secured to the hub 33 is the fly-wheel 35 of the hydro-carbon engine, said fly-wheel being provided with suitable fan blades 36 adapted to produce a forced circulation of air over the generator and the hydro-carbon engine during the operation of the generating plant. The armature of the generator is illustrated at 37, and is preferably wound on the hub 33. In other words, the hub 33 is common to both the fly-wheel of the engine and the armature of the generator. The pole pieces 38 of the generator are shown mounted on the field frame 15 which, as above pointed out, is preferably cast integral with the main casting 10. Bolted or otherwise secured to the front end of the main casting 10 is shown the generator housing frame 39, said frame being provided with suitable openings 40 through which air is drawn by the fan blades 36, all of said air acting to cool first the generator and then the cylinder of the engine, as above pointed out. An outlet 41 for the air is provided in the engine housing 25. A cap is illustrated at 42, and is adapted to form a housing for the timing mechanism 23 to thereby protect the same from dirt, grit, and other foreign substances. Bolted to suitable lugs 43, formed preferably integral with the frame 39, is shown a suitable supporting board 44 on which is mounted the induction coil 45 of the internal combustion engine and the under-load circuit breaker 46, said induction coil 45 being connected to the spark plug 47 of the hydro-carbon engine by means of a suitable conductor 48.

In the operation of the generating plant, fuel and oil from the tank 11 are drawn through a suitable carbureting device (not shown) where they are mixed with air, said mixture being then drawn upwardly through the intake manifold 12 into the annular chamber 29 where it is charged at predetermined intervals into the crank case of the engine through the slot 32 in the bearing and the passage in the shaft 16 as above described. A portion of the oil, as the mixture is fed into the engine, will be deposited on the walls of the annular chamber 29 from whence it drains onto the shaft 16 through the oil duct 49 which extends through the removable sleeve 19 and bearing element 19ª, said oil being then fed along and around the entire surface of said bearing by the rotation of said shaft 16. It will be noted that said shaft will also receive oil from the mixture during the compression stroke of the engine during which time the intake valve is closed and the oil is free to deposit on the shaft as the same revolves past the slot 32. As a further means of conducting oil to the bearing, a suitable oil drip 50 formed at the inner end of the removable sleeve 19 is also provided, said drip being adapted to receive the oil which drains from the cylinder of the engine and to conduct the same to said bearing. The hub 33 is so mounted on the shaft 16 as to provide a slight clearance around the outer end of the removable sleeve 19. Communicating with this clearance is an annular oil sump 51 which communicates with the intake manifold 12 by means of a small passage 52. A slight clearance 53 is also provided whereby the suction of the engine as produced in the intake manifold will act to draw air from the housing 13, through the clearance 53 into the oil sump 51, and thence through passage 52, carrying the oil from said sump into said manifold. As the shaft revolves in contact with its stationary bearing 17, and as the oil is fed thereto in the manner above described, a portion thereof will be discharged from the outer end of said bearing into the clearance provided therearound, from whence said oil will be deposited in the sump 51 where it will be drawn by the suction of the engine, as above described, into the intake manifold thereof, and again mixed with the charge as the same is fed therethrough. Thus it will be noted that all possibilities of oil leakage are avoided. For the purpose of utilizing any oil which may collect in the bottom of the crank case ducts 55, 56, connecting with each other at 55ª adjacent the outer end of the bearing, are provided, the duct 55 communicating with the bottom of the crank case through the depending portion 58 thereof at the inner end of the sleeve, while the duct 56 communicates, as at 57, with the intake chamber 29. Thus, it will be observed, oil which collects in the crank case will be forced through the duct 55 upon each compression stroke of the engine, while upon the intake stroke thereof the suction produced in the chamber 29 will act to draw the oil through duct 56 and into said chamber by reason of the communication between the latter and said duct. The ducts 55, 56 open towards the shaft 16 throughout their lengths, and accordingly the oil as it passes through said ducts is utilized in further lubricating said shaft.

The opposite ends of the babbitt bearing surface are flanged outwardly as at 21 to receive the end thrusts, as above pointed out. Interposed between the outer flanged end of the bearing 17 and the adjacent end of the hub 33 is a suitable washer 54. The crank bob 26 bears against the inner flanged end of the bearing 17.

It will be noted from the above that an extremely simple construction has been provided, and one wherein the number of rubbing and bearing surfaces has been reduced to a minimum. Obviously, changes may be made in the construction herein illustrated without departing from the spirit of the invention, and accordingly it is not desired to limit the same except where limitations appear in the appended claims.

Having thus described our invention, what we claim as new and desire to secure by Letters Patent of the United States is:

1. A single unit generating plant including a hydro-carbon engine, a shaft therefor, a bearing for said shaft, a tank adapted to contain a mixture of oil and fuel for said engine, means whereby said mixture may be drawn from said tank through said bearing and through said shaft into the crank case of said engine, means whereby a portion of said oil, during its passage to said engine is deposited on said bearing to thereby lubricate the same, and means for drawing oil discharged from said bearing back into said manifold.

2. A single unit generating plant including a hydro-carbon engine, a bearing for the shaft of said engine, an intake manifold for said engine surrounding said bearing, means for conducting a portion of the oil fed to said engine to said bearing, and means whereby oil discharged from said bearing will be drawn by the suction of said engine back into said manifold.

3. In a single unit generating plant including a hydrocarbon engine and shaft therefor, a bearing for said shaft having a surrounding chamber for the collection of oil discharged therefrom, means for conducting oil to said bearing, and means whereby oil deposited in said chamber is drawn by the suction of said engine into the intake manifold thereof.

4. In a single unit generating plant including a hydrocarbon engine and shaft therefor, a bearing for said shaft, a sump adapted to receive the lubricant discharged from said bearing, and means for utilizing the crank case pressure of said engine for again feeding said lubricant into contact with said bearing.

5. In an internal combustion engine, a shaft, a bearing therefor, means to convey a lubricant to said bearing, and means for collecting the excess lubricant discharged from said bearing, said collecting means being provided with a plurality of ducts, one communicating with the atmosphere and the other with the intake manifold of said engine.

6. A single unit generating plant comprising a hydrocarbon engine, an electric generator, a shaft common to both, and a multiple piece housing for said elements, the major portion of which is in the form of a single casting comprising the crank case, intake manifold and fly wheel housing of the engine, and the field frame of the generator.

7. A single unit generating plant, comprising a hydrocarbon engine, an electric generator, a shaft common to both, an elongated bearing for said shaft, and a hub keyed to said shaft in advance of said bearing and extending rearwardly over the latter to form a chamber for the collection of oil discharged therefrom.

8. A single unit generating plant, comprising a hydrocarbon engine, an electric generator, a shaft common to both, an elongated bearing for said shaft, a hub keyed to said shaft in advance of said bearing and extending rearwardly over the latter to form a chamber for the collection of oil discharged therefrom, and a passage providing communication between said chamber and the intake manifold of said engine.

In testimony whereof, we have subscribed our names.

EDWARD F. ANDREWS.
RAY E. ACRE.